(12) United States Patent
Lin et al.

(10) Patent No.: US 11,495,192 B2
(45) Date of Patent: Nov. 8, 2022

(54) DISPLAY DEVICE

(71) Applicant: TPK Touch Solutions (Xiamen) Inc., Fujian (CN)

(72) Inventors: Ming Chuan Lin, Taichung (TW); Chun Hui Tseng, Changhua (TW); Su Ming Lin, Taichung (TW)

(73) Assignee: TPK Touch Solutions (Xiamen) Inc., Fujian (CN)

( * ) Notice: Subject to any disclaimer, the term of this patent is extended or adjusted under 35 U.S.C. 154(b) by 134 days.

(21) Appl. No.: 17/036,072

(22) Filed: Sep. 29, 2020

(65) Prior Publication Data
US 2022/0101810 A1    Mar. 31, 2022

(51) Int. Cl.
| | |
|---|---|
| *G09G 5/10* | (2006.01) |
| *G09G 3/36* | (2006.01) |
| *G02F 1/1335* | (2006.01) |
| *G02F 1/1333* | (2006.01) |
| *G02F 1/1334* | (2006.01) |

(52) U.S. Cl.
CPC .............. *G09G 5/10* (2013.01); *G02F 1/1334* (2013.01); *G02F 1/133308* (2013.01); *G02F 1/133555* (2013.01); *G09G 3/36* (2013.01); *G09G 2330/02* (2013.01)

(58) Field of Classification Search
USPC ............ 345/690, 592, 5, 211, 212; 359/320; 349/106, 86
See application file for complete search history.

(56) References Cited

U.S. PATENT DOCUMENTS

| | | | | |
|---|---|---|---|---|
| 2010/0208333 | A1* | 8/2010 | Omote | G02F 1/133308 359/320 |
| 2014/0092080 | A1* | 4/2014 | Fukunaga | G09G 3/3406 345/212 |
| 2014/0293188 | A1* | 10/2014 | Chen | G09G 3/3426 349/86 |
| 2015/0002796 | A1* | 1/2015 | Fukunaga | G02F 1/133555 349/106 |
| 2015/0228089 | A1* | 8/2015 | Perdices-Gonzalez | G09G 3/32 345/592 |

(Continued)

FOREIGN PATENT DOCUMENTS

| | | |
|---|---|---|
| CN | 102591063 A | 7/2012 |
| TW | 567377 B | 12/2003 |

(Continued)

*Primary Examiner* — Thuy N Pardo
(74) *Attorney, Agent, or Firm* — Cooper Legal Group, LLC

(57) ABSTRACT

A display device includes a stacked structure and an outer frame fixedly receiving the stacked structure therein. The stacked structure includes an intelligence light adjustment layer, a display module, and a light-transmitting reflective layer interposed between the display module and the intelligence light adjustment layer. The intelligence light adjustment layer is configured to present one of a first state or a second state, which are different from each other, based on whether electrical power is applied to the intelligence light adjustment layer. The display module projects display images through the intelligence light adjustment layer in the first state. When the intelligence light adjustment layer is in the second state, the color of the outer frame is the same as the color of the intelligence light adjustment layer.

20 Claims, 3 Drawing Sheets

(56) References Cited

U.S. PATENT DOCUMENTS

| | | | |
|---|---|---|---|
| 2015/0228217 A1* | 8/2015 | Perdices-Gonzalez | ........................ G09G 3/32 345/5 |
| 2017/0310940 A1* | 10/2017 | Perdices-Gonzalez | ........................ H04N 9/69 |
| 2017/0310956 A1* | 10/2017 | Perdices-Gonzalez | ........................ G09G 3/3225 |
| 2018/0144695 A1* | 5/2018 | Kita | ........................ G02F 1/1337 |
| 2018/0246380 A1* | 8/2018 | Ma | ........................ G02F 1/13439 |
| 2018/0350311 A1* | 12/2018 | Aoyama | ........................ G02F 1/137 |
| 2021/0192170 A1* | 6/2021 | Ma | ........................ G06F 3/0412 |
| 2021/0341770 A1* | 11/2021 | Hsieh | ........................ G09G 3/36 |
| 2022/0100032 A1* | 3/2022 | Ronen | ........................ G02F 1/1309 |

FOREIGN PATENT DOCUMENTS

| | | |
|---|---|---|
| TW | 200619767 A | 6/2006 |
| TW | M520650 U | 4/2016 |

\* cited by examiner

DISPLAY DEVICE

BACKGROUND

Technical Field

The present disclosure relates to a display device. More particularly, the present disclosure relates to a display device with an outer frame.

Description of Related Art

A conventional display screen includes an outer frame and a display module fixed in the outer frame to expose a display area outwardly from the outer frame. The conventional display screen provides display images through the display area when the conventional display screen is in operation (e.g., booting, etc.).

However, when the conventional display screen is not in operation (e.g., shutting down, etc.), the display area of the conventional display screen normally remains dark and black, which causes there to be poor visual coordination between the display area and the outer frame of the conventional display screen.

SUMMARY

One aspect of the present disclosure is to provide a display device to solve the aforementioned problems of the prior art.

In some embodiments of the disclosure, a display device includes a stacked structure and an outer frame. The stacked structure includes an intelligence light adjustment layer, a display module, and a light-transmitting reflective layer. The intelligence light adjustment layer is used to present one of a first state or a second state, which are different from each other, depending on whether electrical power is applied to the intelligence light adjustment layer. The display module projects display images through the intelligence light adjustment layer when the intelligence light adjustment layer is in the first state. The light-transmitting reflective layer is interposed between the display module and the intelligence light adjustment layer. The outer frame fixedly receives the stacked structure therein. When the intelligence light adjustment layer is in the second state, the color of the outer frame is the same as the color of the intelligence light adjustment layer.

According to one or more embodiments of the disclosure, the foregoing display device further includes a control unit. The control unit is electrically connected to the intelligence light adjustment layer and the display module. When the display module is not in operation, the control unit synchronously stops applying the electrical power to the intelligence light adjustment layer so that the intelligence light adjustment layer is presented into the second state.

According to one or more embodiments of the disclosure, in the foregoing display device, the display module includes a display panel and a backlight module. The backlight module provides a display light to the display panel. The display light of the backlight module goes through the light-transmitting reflective layer and the intelligence light adjustment layer sequentially.

According to one or more embodiments of the disclosure, in the foregoing display device, the intelligence light adjustment layer includes a polymer dispersed liquid crystal (PDLC). When the electrical power is not applied to the intelligence light adjustment layer, the outer frame and the intelligence light adjustment layer are both white.

According to one or more embodiments of the disclosure, in the foregoing display device, a transmittance of the light-transmitting reflective layer is 40% to 50% in a first mode of the display device; and a transmittance of the light-transmitting reflective layer is 50% to 60% in a second mode of the display device.

According to one or more embodiments of the disclosure, in the foregoing display device, the light-transmitting reflective layer is a coating film that is formed on the intelligence light adjustment layer. The display device is in the first mode when the backlight module is turned on, and the display device is in the second mode when the backlight module is turned off.

According to one or more embodiments of the disclosure, in the foregoing display device, the light-transmitting reflective layer is a multi-layer film comprised of a plurality of film layers superimposed on one another, and each of the film layers is $Nb_2O_5$.

According to one or more embodiments of the disclosure, in the foregoing display device, the light-transmitting reflective layer is a monolayer film having an aluminum metallic thin film.

In another embodiment of the disclosure, a display device includes an outer frame, a display module, an intelligence light adjustment layer, a light-transmitting reflective layer, and a control unit. The outer frame surrounds a display area therein. The display module is disposed within the display area of the outer frame. The intelligence light adjustment layer is disposed within the display area of the outer frame. The light-transmitting reflective layer is interposed between the intelligence light adjustment layer and the display module. The control unit is electrically connected to the intelligence light adjustment layer for controlling whether electrical power is applied to the intelligence light adjustment layer. When the control unit stops applying the electrical power to the intelligence light adjustment layer, a color of the intelligence light adjustment layer is changed so as to conceal the display module.

According to one or more embodiments of the disclosure, in the foregoing display device, the color of the intelligence light adjustment layer is changed to be the same as the color of the outer frame.

According to one or more embodiments of the disclosure, in the foregoing display device, the control unit is electrically connected to the display module. When the display module is not in operation, the control unit synchronously stops applying the electrical power to the intelligence light adjustment layer. When the display module is in operation, the control unit synchronously applies the electrical power to the intelligence light adjustment layer so that the color of the intelligence light adjustment layer becomes transparent to reveal the display module.

According to one or more embodiments of the disclosure, in the foregoing display device, the display module includes a display panel and a backlight module. The display panel is disposed within the display area. The backlight module provides a display light to the display panel. The display light of the backlight module goes through the light-transmitting reflective layer and the intelligence light adjustment layer sequentially.

According to one or more embodiments of the disclosure, in the foregoing display device, the intelligence light adjustment layer includes a polymer dispersed liquid crystal (PDLC). When the electrical power is stopped being applied to the intelligence light adjustment layer, the outer frame and the intelligence light adjustment layer are both white.

According to one or more embodiments of the disclosure, in the foregoing display device, a transmittance of the light-transmitting reflective layer is 40% to 50% in a first mode of the display device; and a transmittance of the light-transmitting reflective layer is 50% to 60% in a second mode of the display device.

According to one or more embodiments of the disclosure, in the foregoing display device, the light-transmitting reflective layer is a coating film that is formed on the intelligence light adjustment layer. The display device is in the first mode when the backlight module is turned on, and the display device is in the second mode when the backlight module is turned off.

According to one or more embodiments of the disclosure, in the foregoing display device, the light-transmitting reflective layer is a multi-layer film comprised of a plurality of film layers superimposed on one another, wherein each of the film layers is $Nb_2O_5$.

According to one or more embodiments of the disclosure, in the foregoing display device, the light-transmitting reflective layer is a monolayer film having an aluminum metallic thin film.

Thus, through the structure of the above embodiments, the disclosure is able to improve the visual coordination between the display area of the display device when operation is stopped and the outer frame thereof, so as to achieve the purpose of satisfaction and preference.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure and are incorporated in and constitute a part of this specification. The drawings illustrate embodiments of the disclosure and, together with the description, serve to explain the principles of the disclosure.

DETAILED DESCRIPTION

Figure 1:
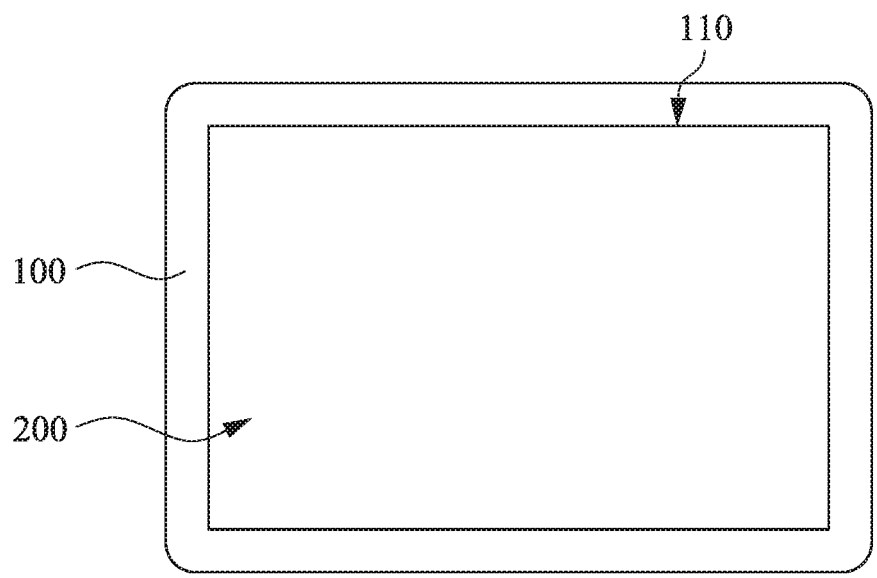
FIG. 1 is a front view of a display device according to some embodiments of the present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
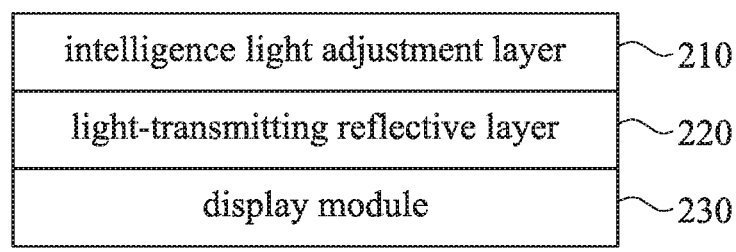
FIG. 2 is a sectional view of the stacked structure of the display device in FIG. 1.

Reference is now made to FIG. 1 to FIG. 2, in which FIG. 1 is a front view of a display device 10 according to some embodiments of the present disclosure, and FIG. 2 is a sectional view of a stacked structure 200 of the display device 10 in FIG. 1. As shown in FIG. 1 and FIG. 2, in some embodiments, the display device 10 includes an outer frame 100 and a stacked structure 200. The outer frame 100 forms a square-ring shape that surrounds a central portion of the display device 10 to define a display area 110. The outer frame 100 fixedly receives the stacked structure 200 to place the stacked structure 200 in the display area 110 so as to protect the stacked structure 200. The stacked structure 200 is fixed together through a sealant structure (not shown), so that the sealant structure wraps to surround all sides of the stacked structure 200. However, the disclosure is not limited to thereto.

The stacked structure 200 includes an intelligence light adjustment layer 210, a light-transmitting reflective layer 220, and a display module 230. The light-transmitting reflective layer 220 is interposed between the intelligence light adjustment layer 210 and the display module 230. The display module 230 is able to project display images outwardly through the intelligence light adjustment layer 210 and the light-transmitting reflective layer 220. The intelligence light adjustment layer 210 is able to alternatively present a first state or a second state, which are different from each other, based on whether electrical power is applied to the intelligence light adjustment layer 210. In other words, when the electrical power is applied to the intelligence light adjustment layer 210, the intelligence light adjustment layer 210 is turned into the first state in which the color of the intelligence light adjustment layer 210 becomes transparent to reveal the display module 230 under the intelligence light adjustment layer 210. When the electrical power is not applied to the intelligence light adjustment layer 210, the intelligence light adjustment layer 210 is turned into the second state in which the color of the intelligence light adjustment layer 210 is changed to conceal the display module 230 under the intelligence light adjustment layer 210.

In this way, since the display area 110 of the display device 10 is not in operation and remains dark and black, the intelligence light adjustment layer 210 in the second state hides the display module 230 to reduce the awkwardness (e.g., contrasting colors) on the front side of the display device 10. Thus, the disclosure is able to improve the visual coordination between the display area 110 of the display device 10 that is not in operation and its outer frame 100, so as to achieve the purpose of increasing satisfaction and preference.

As one example, the intelligence light adjustment layer 210 includes a polymer dispersed liquid crystal (PDLC). When electrical power is applied to the polymer dispersed liquid crystal (PDLC), the polymer dispersed liquid crystal (PDLC) is turned into the first state in which the color of the polymer dispersed liquid crystal (PDLC) becomes transparent. When electrical power is not applied to the polymer dispersed liquid crystal (PDLC), the polymer dispersed liquid crystal (PDLC) is turned into the second state in which the color of the polymer dispersed liquid crystal (PDLC) is white or off-white, or at least opaque. However, the disclosure is not limited to this type or material of the intelligence light adjustment layer 210.

In one example, the color of the outer frame 100 is designed (i.e., selected) to be white or off-white, so that the color of the outer frame 100 is the same as or approximately the same as the color of the intelligence light adjustment layer 210. In this way, the front side of the display device 10, including the outer frame 100 and display area 110, will have the same color overall when the display device 10 is not in operation. Therefore, the visual abruptness will not occur due to the dark display area 110.

In some embodiments, the light-transmitting reflective layer 220 is a coating film that is formed on the intelligence light adjustment layer 210. For example, the coating film is integrally formed on a surface of the intelligence light adjustment layer 210 facing towards the display module 230 through an electroplating process.

Also, in some embodiments, the aforementioned coating film is a multi-layer film comprised of a plurality of film layers superimposed on one another. More particularly, each of the film layers is, for example, $Nb_2O_5$. However, the disclosure is not limited to this specific type of material for the film layers. In other embodiments, the light-transmitting reflective layer 220 may also be a monolayer film. Specifically, the monolayer film is a metallic thin film. For example, the monolayer film is an aluminum metallic thin film. However, the disclosure is not limited to this specific type of material for the monolayer film.

Figure 3:
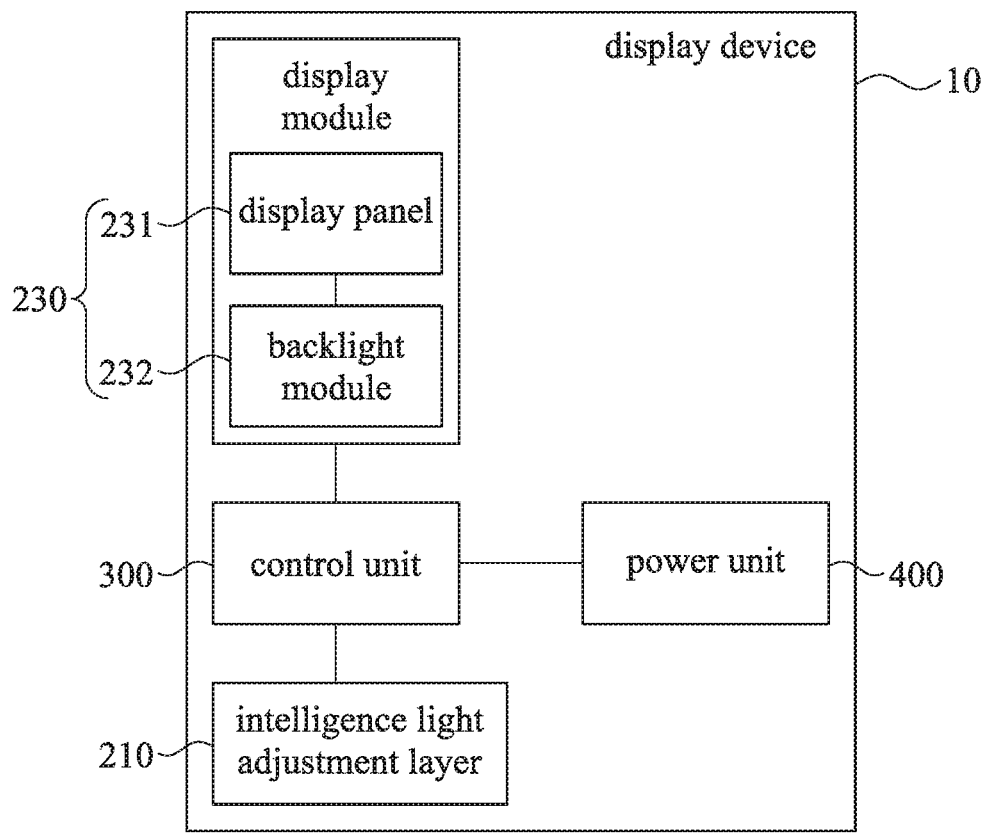
FIG. 3 is a block diagram of the display device in FIG. 1.

FIG. 3 is a block diagram of the display device in FIG. 1. As shown in FIG. 2 and FIG. 3, the display device 10 further includes a control unit 300 and a power unit 400. The control unit 300 is electrically connected to the intelligence light adjustment layer 210, the display module 230, and the power unit 400. The control unit 300 is used to instruct the power unit 400 to apply electrical power to the intelligence light adjustment layer 210 and the display module 230, respectively. When the display module 230 is shut down, the control unit 300 simultaneously stops applying the electrical power to the intelligence light adjustment layer 210 so that the intelligence light adjustment layer 210 is turned into the second state. In addition, the aforementioned control unit 300 is not limited to any form of hardware (e.g., central processing unit (CPU), graphics processing unit (GPU), or other control circuits), software, or firmware.

More specifically, the display module 230 includes a display panel 231 and a backlight module 232. For example, the display panel 231 is fixedly disposed on the light-transmitting reflective layer 220 through optical glues or water glues. The backlight module 232 is used to provide display light to the display panel 231, and the display light of the backlight module 232 goes through the light-transmitting reflective layer 220 and the intelligence light adjustment layer 210 sequentially.

For example, the display panel 231 includes an array substrate, an opposite substrate, and a liquid crystal layer (not shown in figures). The liquid crystal layer is interposed between the array substrate and the opposite substrate. By applying voltage to generate an electric field on the liquid crystal layer, an orientation of the liquid crystal molecules of the liquid crystal layer and a polarization of the incident light are determined to display images. In addition, the backlight module 232 may also be, for example, a front light module. For example, the backlight module 232 includes a light emitting unit and a light guide module. The light-emitting unit is, for example, a light-emitting diode, a miniature light-emitting diode, an organic light-emitting diode, and the like. The light guide module is, for example, a light guide plate, a diffuser, etc.

Furthermore, when the display device 10 is in a first mode, that is, the backlight module 232 is turned on, a transmittance of the light-transmitting reflective layer 220 being penetrated through by lights of the backlight module 232 is 40% to 50%. In a second mode of the display device, that is, the backlight module 232 is turned off, a transmittance of the light-transmitting reflective layer 220 being penetrated through by lights of the backlight module 232 is 50% to 60%. However, the disclosure is not limited thereto. In another embodiment, when the display device 10 is in a first mode, a transmittance of the light-transmitting reflective layer 220 can also be 30% to 70% or 40% to 60%. When the display device 10 is in a second mode, a transmittance of the light-transmitting reflective layer 220 can also be 50% to 70%.

Figure 4A:
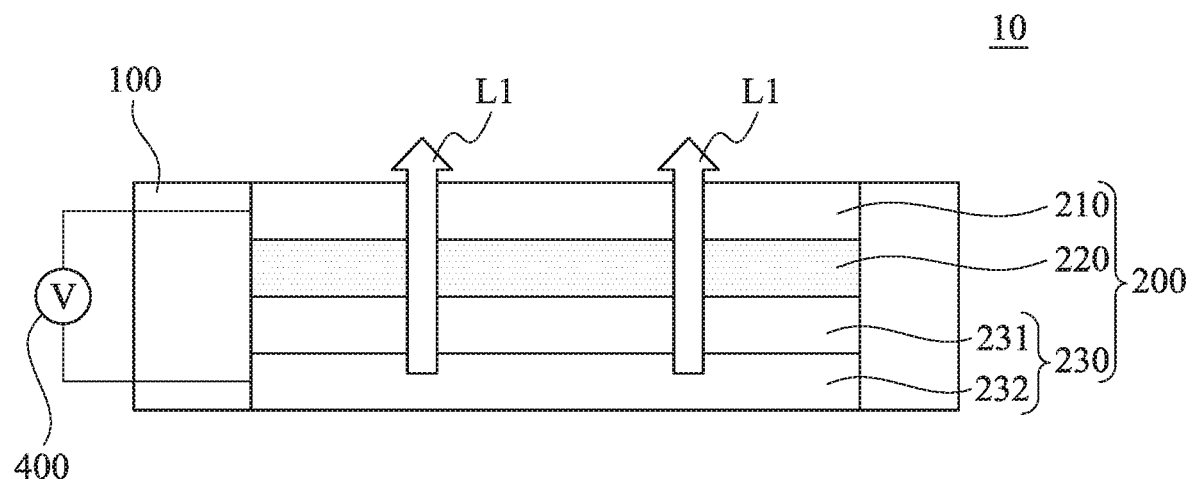
FIG. 4A and FIG. 4B are operational schematic views of an intelligence light adjustment layer respectively in a first mode and a second mode according to the embodiment of the present disclosure.
Figure 4B:
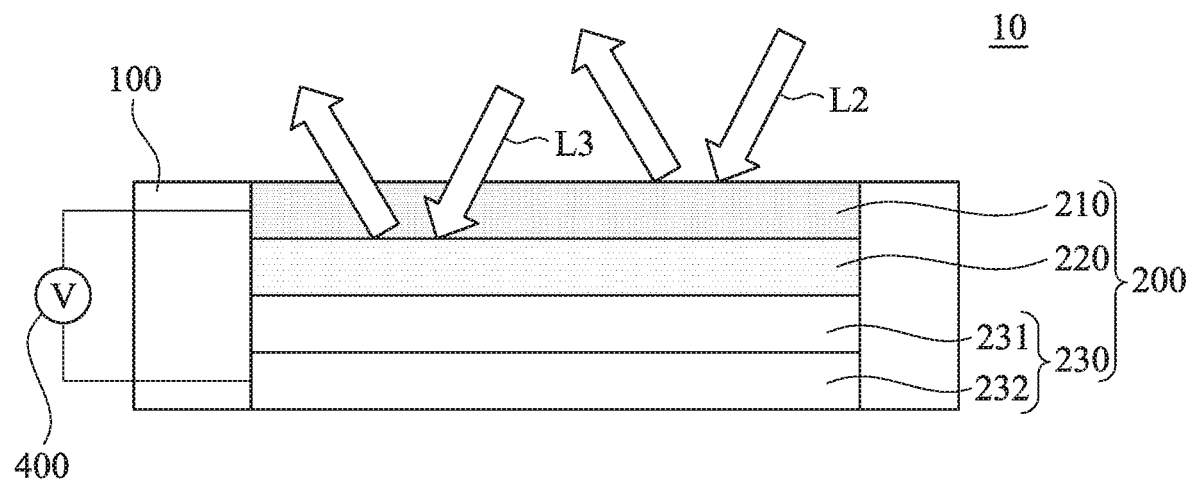

FIG. 4A and FIG. 4B are operational schematic views of the intelligence light adjustment layer 210 respectively in the first mode and the second mode according to embodiments of the present disclosure. As shown in FIG. 4A, when the display module 230 is in operation, the control unit 300 is used to instruct the power unit 400 to apply electrical power to the intelligence light adjustment layer 210, so that the intelligence light adjustment layer 210 is electrically triggered to be transparent (e.g., in the first state), thereby revealing the display module 230 under the intelligence light adjustment layer 210. Thus, the display module 230 is able to project display images outwardly through the intelligence light adjustment layer 210 and the light-transmitting reflective layer 220. Since the display light L1 of the display module 230 is able to pass through the light-transmitting reflective layer 220 and the intelligence light adjustment layer 210, the user can see through to the display module 230 under the intelligence light adjustment layer 210.

As shown in FIG. 4B, when the display module 230 is not in operation, the control unit 300 instructs the power unit 400 to apply electrical power to the intelligence light adjustment layer 210, so that the color of the intelligence light adjustment layer 210 is electrically triggered to be dim enough to conceal the display module 230 under the intelligence light adjustment layer 210. Since one part of external ambient light L2 is reflected by the intelligence light adjustment layer 210 and another part of the external ambient light L3 is reflected by the light-transmitting reflective layer 220, the intelligence light adjustment layer 210 covers the display module 230, thereby inhibiting the user from seeing the display module 230 through the intelligence light adjustment layer 210. More preferably, since the outer frame 100 and the intelligence light adjustment layer 210 are both the same in color, the front side of the display device 10 has the same color overall when the display device 10 is not in operation, so the visual abruptness will not occur due to the dark display area 110.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A display device, comprising:
 a stacked structure, comprising:
  an intelligence light adjustment layer for presenting one of a first state or a second state, which are different from each other, based on whether electrical power is applied to the intelligence light adjustment layer;
  a display module for projecting display images through the intelligence light adjustment layer when the intelligence light adjustment layer is in the first state, wherein the display module comprises:
   a display panel; and
   a backlight module for providing a display light to the display panel; and
  a light-transmitting reflective layer interposed between the display module and the intelligence light adjustment layer, wherein the display light of the backlight module goes through the light-transmitting reflective layer and the intelligence light adjustment layer sequentially; and
an outer frame fixedly receiving the stacked structure therein,
wherein, when the intelligence light adjustment layer is in the second state, a color of the outer frame is the same as a color of the intelligence light adjustment layer.

2. The display device of claim 1, further comprising:
a control unit electrically connected to the intelligence light adjustment layer and the display module,
wherein, when the display module is not in operation, the control unit synchronously stops applying the electrical power to the intelligence light adjustment layer so that the intelligence light adjustment layer is presented into the second state.

3. The display device of claim 1, wherein the intelligence light adjustment layer comprises a polymer dispersed liquid crystal (PDLC),
wherein when the electrical power is not applied to the intelligence light adjustment layer, the outer frame and the intelligence light adjustment layer are both white.

4. The display device of claim 1, wherein a transmittance of the light-transmitting reflective layer is 40% to 50% in a first mode of the display device; and a transmittance of the light-transmitting reflective layer is 50% to 60% in a second mode of the display device.

5. The display device of claim 4, wherein the light-transmitting reflective layer is a coating film that is formed on the intelligence light adjustment layer,
wherein the display device is in the first mode when the backlight module is turned on, and the display device is in the second mode when the backlight module is turned off.

6. The display device of claim 1, wherein the light-transmitting reflective layer is a multi-layer film comprised of a plurality of film layers superimposed on one another, wherein each of the film layers is $Nb_2O_5$.

7. The display device of claim 1, wherein the light-transmitting reflective layer is a monolayer film having an aluminum metallic thin film.

8. A display device, comprising:
an outer frame surrounding a display area therein;
a display module disposed within the display area of the outer frame, wherein the display module comprises:
a display panel disposed within the display area; and
a backlight module for providing a display light to the display panel;
an intelligence light adjustment layer disposed within the display area of the outer frame;
a light-transmitting reflective layer interposed between the intelligence light adjustment layer and the display module, wherein the display light of the backlight module goes through the light-transmitting reflective layer and the intelligence light adjustment layer sequentially; and
a control unit electrically connected to the intelligence light adjustment layer for controlling whether electrical power is applied to the intelligence light adjustment layer,
wherein when the control unit stops applying the electrical power to the intelligence light adjustment layer, a color of the intelligence light adjustment layer is changed so as to conceal the display module.

9. The display device of claim 8, wherein the color of the intelligence light adjustment layer is changed to be the same as a color of the outer frame.

10. The display device of claim 8, wherein the control unit is electrically connected to the display module,
wherein, when the display module is not in operation, the control unit synchronously stops applying the electrical power to the intelligence light adjustment layer,
when the display module is in operation, the control unit synchronously applies the electrical power to the intelligence light adjustment layer so that the color of the intelligence light adjustment layer becomes transparent to reveal the display module.

11. The display device of claim 8, wherein the intelligence light adjustment layer comprises a polymer dispersed liquid crystal (PDLC),
wherein when the electrical power is stopped being applied to the intelligence light adjustment layer, the outer frame and the intelligence light adjustment layer are both white.

12. The display device of claim 8, wherein a transmittance of the light-transmitting reflective layer is 40% to 50% in a first mode of the display device; and a transmittance of the light-transmitting reflective layer is 50% to 60% in a second mode of the display device.

13. The display device of claim 12, wherein the light-transmitting reflective layer is a coating film that is formed on the intelligence light adjustment layer,
wherein the display device is in the first mode when the backlight module is turned on, and the display device is in the second mode when the backlight module is turned off.

14. The display device of claim 8, wherein the light-transmitting reflective layer is a multi-layer film comprised of a plurality of film layers superimposed on one another, wherein each of the film layers is $Nb_2O_5$.

15. The display device of claim 8, wherein the light-transmitting reflective layer is a monolayer film having an aluminum metallic thin film.

16. A display device, comprising:
a stacked structure, comprising:
an intelligence light adjustment layer for presenting one of a first state or a second state, which are different from each other, based on whether electrical power is applied to the intelligence light adjustment layer;
a display module for projecting display images through the intelligence light adjustment layer when the intelligence light adjustment layer is in the first state; and
a light-transmitting reflective layer interposed between the display module and the intelligence light adjustment layer; and
an outer frame fixedly receiving the stacked structure therein, wherein:
when the intelligence light adjustment layer is in the second state, a color of the outer frame is the same as a color of the intelligence light adjustment layer,
the intelligence light adjustment layer comprises a polymer dispersed liquid crystal (PDLC), and
when the electrical power is not applied to the intelligence light adjustment layer, the outer frame and the intelligence light adjustment layer are both white.

17. The display device of claim 16, further comprising:
a control unit electrically connected to the intelligence light adjustment layer and the display module,
wherein, when the display module is not in operation, the control unit synchronously stops applying the electrical power to the intelligence light adjustment layer so that the intelligence light adjustment layer is presented into the second state.

18. The display device of claim 16, wherein the light-transmitting reflective layer is a multi-layer film comprised of a plurality of film layers superimposed on one another, wherein each of the film layers is $Nb_2O_5$.

19. The display device of claim 16, wherein the light-transmitting reflective layer is a monolayer film having an aluminum metallic thin film.

20. The display device of claim 16, wherein a transmittance of the light-transmitting reflective layer is 40% to 50% in a first mode of the display device; and a transmittance of the light-transmitting reflective layer is 50% to 60% in a second mode of the display device.

* * * * *